Sept. 22, 1931.          C. E. FRIARS          1,823,934
REPLACEABLE PORCELAIN TIPPED PONTIC TOOTH Filed April 18, 1927

WITNESSES

Inventor
CLARENCE E. FRIARS

Attorney

Patented Sept. 22, 1931

1,823,934

UNITED STATES PATENT OFFICE

CLARENCE E. FRIARS, OF TACOMA, WASHINGTON

REPLACEABLE PORCELAIN TIPPED PONTIC TOOTH

Application filed April 18, 1927. Serial No. 184,701.

This invention relates to artificial dentures and has as its primary object to provide a replaceable porcelain facing for bridge work having a porcelain tip. Replaceable facings have been devised for bridge work but in the construction of such facings they are molded devoid of a tip at the gingival end and at this end the ordinary facing merely abuts against the outer side of the gum and a space is left at the inner side of the pontic tooth in which food may collect with disastrous results. Likewise facings have been made with tips but they have not been capable of replacement and therefore if broken it is necessary to supply entire new bridge work. It is therefore an important object of the present invention to provide a replaceable facing embodying a tip at the gingival end thereof and which tip will be molded and baked integral with the facing and of glazed porcelain which is the most desirable material for the purpose as it is not antagonistic to the gum tissues and is unaffected by the acids in gastric juices. Therefore the present invention contemplates a facing presenting the advantages of a facing having a gingival tip and likewise the advantages of a replaceable facing and, so far as I am aware, no facing has previously been designed possessing both of these features in combination.

Where, in prior practice, facings have been made replaceable, it has been customary to reinforce the facing by providing a reinforcement of gold, constituting an integral part of the bridge work, and extending over the incisal end of the facing, such reinforcement being necessary to prevent, not only, breaking of the facing but also separation thereof from the bridge, which is liable to occur in the mastication of hard food. Therefore the present invention has as a further object to provide a replaceable facing so constructed and so mounted as to entirely avoid the necessity of reinforcing its incisal end.

Another object of the invention is to provide a bridge work facing and backing therefor so constructed and adapted to be so assembled that the entire bridge may be made up before the teeth, which are to be replaced, are extracted, and, inasmuch as the facing of the present invention embodies a gingival tip, the said tip may enter a short distance into the socket in the gum from which the natural tooth was extracted thus permitting the gum tissue to heal about the tip and thereby greatly enhance the natural appearance of the artificial denture.

Figure 1:
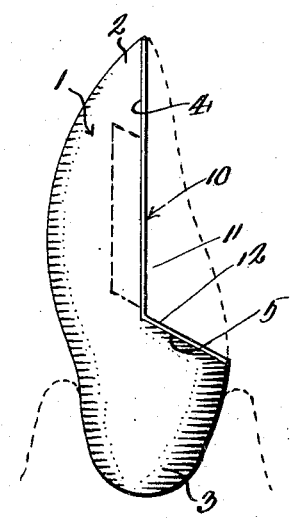
Fig. 1 is a view in elevation of a replaceable porcelain facing having a gingival tip, and the mounting for the facing.

In the drawings the artificial denture is illustrated as comprising a facing 1 which in practice will be of glazed porcelain and molded in imitation of the natural tooth which it is to replace, the facing having an incisal end 2 and being provided, in the process of molding, with an integral gingival tip 3. The outer side of the facing is as stated molded in imitation of the natural tooth which the facing is to replace and the inner side of the facing is recessed to provide a flat face 4 which, in the natural position of the denture in the mouth, will occupy a vertical plane, and a bottom face 5 which is inclined downwardly and inwardly at an obtuse angle to the plane of the face 4. For a purpose to be presently explained, the facing 1 is formed in its inner face 4 with a vertically extending groove 5 having parallel side walls 6 and a vertical inner wall 7 occupying a plane parallel to the plane occupied by the face 4. The upper and lower end walls of the groove, indicated respectively by the numerals 8 and 9, are parallel to each other but are inclined downwardly and inwardly respectively at acute and obtuse angles to the plane of the inner wall 7 and both of these walls 8 and 9 occupy planes parallel to the plane of the bottom face 5 of the recess.

Figure 3:
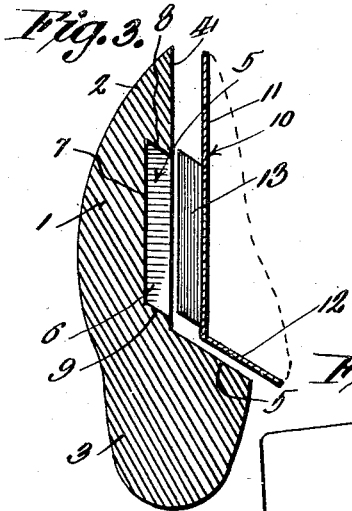
Fig. 3 is a vertical sectional view through the facing and mounting illustrating the manner in which the facing is adapted to be assembled with and removed from the mounting.
Figure 4:
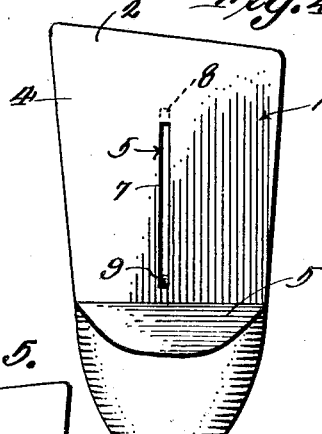
Fig. 4 is a rear elevation of the facing.
Figure 5:
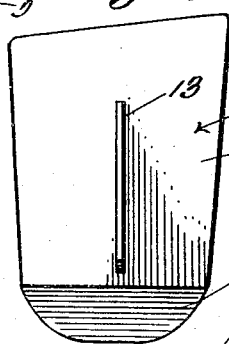
Fig. 5 is a front elevation of the mounting.

The backing or mounting for the facing is indicated in general by the numeral 10 and the same comprises a plate 11 having the same marginal contour as the flat inner face 4 of the facing 1, the said plate 11 being likewise of the same dimensions as the said face 4 of the facing so that its edges are in registration with the margin of the facing at the inner sides thereof. The plate 11 is provided at its lower end with a downwardly and inwardly inclined extension 12 which is disposed at the same angle with respect to the plate as is the bottom wall 5 of the recess with respect to the wall or face 4 thereof. Likewise the extension 12 of the plate 11 is of the same marginal contour and dimensions as the bottom face or wall 5 of the recess in the facing. The groove 5 constitutes a socket in which is snugly received an anchoring tongue 13 which is integrally formed upon the outer face of the plate 11. This tongue 13 is of a thickness equal substantially to the width of the groove or socket 5 and has its rear edge parallel to the plane of the face of the plate 11 upon which it is formed and its upper and lower end edges inclined to correspond to the angular disposition of the upper and lower end walls 8 and 9 of the said groove or socket 5. In practice, the locking or anchoring tongue 13 will be of dimensions substantially the same as the dimensions of the groove or socket 5 and the tongue is located upon the outer face of the plate 11 precisely in the manner that the socket is located in the face or wall 4 of the recess in the facing so that when the facing is assembled with the backing 10 in the manner illustrated in Figure 3 of the drawings, the anchoring tongue 13 will fit snugly in the groove or socket 5 and the outer and under faces of the plate 11 and its extension 12 will abut flat against the faces 4 and 5 of the facing 1 as shown clearly in Figure 1 of the drawings. It will be evident at this point that due to the corresponding inclination of the upper and lower end walls of the socket 5 and the upper and lower end edges of the tongue 13 and likewise the extension 12 of the plate 11, the facing may be applied to the backing with great facility and when once applied will snugly and precisely fit the backing. Of course any suitable cement may be employed for uniting the facing to the backing and it will be quite evident that the facing and backing are so constructed that when they are assembled the facing will be firmly and securely supported.

It will likewise be evident by reference to Figure 1 that while the facing is replaceable, its gingival end, being provided with the tip 3, is adapted to seat in the socket in the tissues of the gum left remaining by the extraction of the natural tooth, which the facing is to replace, and therefore, inasmuch as the gingival tip of the facing is of glazed porcelain, the gum tissues will heal about the said tip thus greatly enhancing the natural appearance of the artificial denture. It will likewise be evident that due to the means provided for anchoring the facing to the backing, the employment of any bracing or reinforcing means for coaction with the incisal end of the facing is entirely avoided.

From the foregoing description of the invention it will be seen that I have provided a replaceable porcelain facing having a gingival tip, so that as a consequence the artificial denture embodying the invention possesses the advantages of an artificial facing having a tip at its gingival end and the further advantage that it can be replaced in the event of breakage. It will likewise be evident that due to the peculiar formation of the anchoring means for the facing, the facing is prevented from displacement in an outward direction with respect to the backing and can only be removed by an upward displacement at the time it is outwardly moved away from the backing.

It will be understood of course that the backing 10 is to be supported by the bridge work in accordance with established practice.

Figure 2:
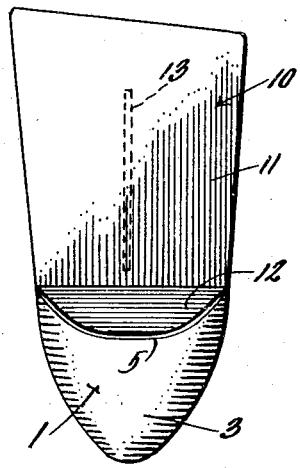
Fig. 2 is a rear elevation of the denture shown in Figure 1.

It will be observed by reference to Figures 1 and 2 of the drawings that the gingival tip 3 of the facing 1 is located bodily below the backing 10 and is of dimensions such as to substantially equal the dimensions of the gingival end of the natural tooth which the facing is to replace.

It is to be understood, of course, that various changes may be made, within the scope of what is claimed, without departing from the spirit of the invention.

Having thus described my invention, what I claim is:

1. An artificial tooth comprising a facing having an integral gingival tip and provided with a perpendicular face and a face inclined downwardly and inwardly from the perpendicular face and at an obtuse angle thereto and being provided in the perpendicular face with a relatively narrow perpendicular groove constituting a socket and having side walls parallel to each other throughout their length and downwardly and inwardly inclined upper and lower end walls, and a backing comprising a portion for contact with the perpendicular face of the facing and another portion extending at an obtuse angle thereto for engagement with the second mentioned face, and a perpendicular anchoring tongue upon the first mentioned portion of the backing of uniform thickness throughout and of the same thickness as the backing and of dimensions to fit snugly within said groove and having downwardly and inwardly inclined upper and lower end edges, the angle of inclination of the upper and lower end walls of the groove, the upper and lower end edges of the anchoring tongue, and the inclination of the second mentioned face of the facing and the second mentioned portion of the backing all being the same.

2. An artificial tooth comprising a facing having an integral, gingival tip and provided on the lingual side with a longitudinal face and a face inclined labio-occlusally to the longitudinal face and being provided in the longitudinal face with a groove constituting a socket and having labio-occlusally inclined occlusal and gingival end walls, and a backing having complementary faces, an anchoring tongue upon the longitudinal face of the backing and of dimensions to fit within said groove and having labio-occlusally inclined occlusal and gingival end edges, the said end walls and edges, the second mentioned face of the facing and its complementary face of the backing all having the same inclination to the longitudinal face of the facing.

In testimony whereof I affix my signature.

CLARENCE E. FRIARS.